(12) United States Patent
Ukropec et al.

(10) Patent No.: US 8,783,012 B2
(45) Date of Patent: Jul. 22, 2014

(54) ESTIMATION OF EFFICIENCY FOR AGED CATALYSTS

(75) Inventors: Robert Ukropec, Aachen (DE); Alexey A. Dubkov, Aachen (DE); Yasser Mohamed Sayed Yacoub, Cologne (DE); Albert N. Chigapov, Krasnoyarsk (RU); Nina Shishkina, legal representative, Krasnoyarsk (RU); Brendan Patrick Carberry, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 226 days.

(21) Appl. No.: 13/536,914

(22) Filed: Jun. 28, 2012

(65) Prior Publication Data

US 2013/0008149 A1   Jan. 10, 2013

(30) Foreign Application Priority Data

Jul. 6, 2011 (EP) .................................... 11172809

(51) Int. Cl.
*F01N 11/00* (2006.01)

(52) U.S. Cl.
USPC .................. 60/274; 60/277; 60/286; 60/295; 60/301

(58) Field of Classification Search
USPC .................. 60/274, 277, 286, 295, 299, 301
See application file for complete search history.

(56) References Cited

U.S. PATENT DOCUMENTS

| | | | |
|---|---|---|---|
| 5,896,743 A | 4/1999 | Griffin | |
| 2008/0216463 A1* | 9/2008 | Chaineux et al. | 60/274 |
| 2009/0158710 A1* | 6/2009 | Suzuki | 60/285 |
| 2009/0272099 A1* | 11/2009 | Garimella et al. | 60/277 |
| 2010/0024393 A1* | 2/2010 | Chi et al. | 60/276 |
| 2010/0242440 A1* | 9/2010 | Garimella et al. | 60/276 |

FOREIGN PATENT DOCUMENTS

| | | |
|---|---|---|
| DE | 10055528 A1 | 5/2001 |
| EP | 0786586 A2 | 7/1997 |
| EP | 0756071 B1 | 10/2001 |
| EP | 1084331 B1 | 11/2001 |

(Continued)

OTHER PUBLICATIONS

ISA European Patent Office, Search Report of EP11172809.3, Dec. 3, 2012, Munich, Germany, 4 pages.
Ruckenstein, E. et al., "Growth Kinetics and the Size Distributions of Supported Metal Crystallites," Journal of Catalysis, vol. 29, 1973, pp. 224-245.

(Continued)

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP

(57) ABSTRACT

Systems and methods for estimating an efficiency of a catalyst placed in an exhaust path of a combustion engine are disclosed. In one example approach, a method comprises: ageing the catalyst consecutively at different temperatures for definite time periods; measuring the catalyst conversion efficiency after each ageing step; calculating the ageing factor for each step of the ageing procedure and the accumulative value of the ageing factors for all steps of the ageing procedure; estimating catalyst efficiency correlation factors related to the measured catalyst conversion efficiency for each temperature point and for all ageing conditions; determining a correlation between the catalyst efficiency correlation factors and the accumulative value of the ageing factors; and calculating the conversion efficiency of the aged catalyst based on a predetermined correlation between the accumulative ageing factor and the catalyst efficiency correlation factor.

9 Claims, 8 Drawing Sheets

(56) References Cited

FOREIGN PATENT DOCUMENTS

| | | | |
|---|---|---|---|
| EP | 1544431 B1 | * | 1/2007 |
| GB | 2475318 A | | 5/2011 |
| WO | 2010096793 A2 | | 8/2010 |

OTHER PUBLICATIONS

Schaper, H. et al., "The Influence of Lanthanum Oxide on the Thermal Stability of Gamma Alumina Catalyst Supports," Applied Catalysis, vol. 7, 1983, pp. 211-220.

* cited by examiner

ESTIMATION OF EFFICIENCY FOR AGED CATALYSTS

RELATED APPLICATIONS

The present application claims priority to European Patent Application No. 11172809.3, filed on Jul. 6, 2011, the entire contents of which are hereby incorporated by reference for all purposes.

BACKGROUND AND SUMMARY

It is in the interest of car manufacturers that aftertreatment devices are robust and keep good performance in the terms of delivering legislatively acceptable low emissions for the life time of the vehicle, or at least for 120 000 km driven distance. To fulfill these criteria, an on-board diagnostic system equipped with the method of prediction of catalyst condition is a useful tool to keep optimal operation conditions for the catalyst, and all other parts of after-treatment system.

A method of monitoring a catalyst using a lifetime temperature profile is disclosed in U.S. Pat. No. 5,896,743. U.S. Pat. No. 5,896,743 relates to a monitor for measuring the efficiency of a catalyst located in an exhaust path of an internal combustion engine. The monitor includes a resistive type oxygen sensor positioned in the exhaust path between the engine and the catalyst to detect oxygen concentration of engine emissions, and a temperature sensor positioned proximate to the catalyst for monitoring catalyst temperature. A lifetime temperature profile and a catalyst light off time are generated from a catalyst temperature received from the temperature sensor. There are three comparators, a first comparator for comparing a magnitude of the detected oxygen concentration to a predetermined threshold level; a second comparator for receiving the catalyst light off time and comparing the light off time to a predetermined light off time; a third comparator for receiving the lifetime temperature profile and comparing the lifetime temperature profile to a predetermined temperature profile threshold limit. According to this cited method, time events at which the catalyst temperature exceeds the predetermined limit (800° C.) are counted with different weighing factors depending on a temperature level, thus generating a lifetime temperature profile of the catalyst allowing for estimating the efficiency of a catalyst.

In some investigations, sintering was found to be the one of the primary mechanisms of deactivation of catalysts operating at elevated temperatures. The uniform approach quantifying catalyst thermal ageing in terms of sintering can be applied to both metal oxide catalysts silica, alumina etc. (H. Schaper, et. al. Appl. Catal., 7 (1983) 211;) and supported metal catalysts such as supported noble metal catalysts (E. Ruckenstein et al. J. catal., 29, 224-45 (1973).

EP 1 084 331 B1 relates to a method for monitoring the ability of a catalyst arranged in the exhaust duct of an internal combustion engine, in which a first variable, which is characteristic of the temperature of the catalyst, and a second variable, which is characteristic of the degree of conversion of the catalyst and is dependent on the first variable, are determined by continuous measurements during a heating-up phase of the catalyst, and a change in the dependence of the second variable on the first variable is caused by ageing of the catalyst and is used to monitor the ability function of the catalyst.

EP 0 756 071 B1 relates to a device for determining the abnormal degree of deterioration of catalyst of a catalytic converter arranged in an internal combustion engine exhaust system, comprising measuring a temperature of said catalyst, assuming a temperature of said catalyst on the basis of the engine operating condition, calculating a ratio of a varying value of the measured temperature by said measuring means to a varying value of the assumed temperature by said assuming means; and determining means for determining that the degree of deterioration of said catalyst is abnormal when said ratio is smaller than a predetermined value.

EP 0786586 A2 relates to a device for evaluating performance deterioration of an exhaust gas purifying catalyst, comprising temperature detecting means arranged in an exhaust passage for detecting a temperature of an exhaust gas purifying catalyst, oxygen concentration detecting means arranged in the exhaust passage for detecting a concentration of oxygen contained in an exhaust gas, calculating means for calculating a degree of catalyst performance deterioration in a predetermined period on the basis of the temperature of the catalyst detected by said temperature detecting means and the concentration of oxygen detected by said oxygen concentration detecting means; accumulating means for cumulatively adding the degree of catalyst performance deterioration in said predetermined period to obtain an accumulated value; and evaluating means for evaluating the catalyst performance deterioration on the basis of the accumulated value.

EP 1 544 431 B1 discloses a method for monitoring a status of a catalyst, which allows more precise evaluation of a degree of the thermal ageing of the catalyst (or a degree of the catalyst performance that is still available for exhaust gas after-treatment). According to the mentioned invention, there is provided a method of estimating the efficiency of a catalyst located in the exhaust path and/or downstream of an internal combustion engine comprising the steps of: monitoring a temperature of the catalyst with at least one temperature sensor over the catalyst operating time; calculating an accumulative exposure of the catalyst to thermal ageing conditions with the measured catalyst temperature; applying a predetermined correlation between the accumulative exposure of the catalyst to the thermal ageing conditions and characteristic of the catalyst performance to estimate the catalyst properties; comparing the accumulative exposure of the catalyst to thermal ageing conditions to a predetermined threshold limit of the thermal ageing conditions; and performing indicative measures in case of the actual value of the accumulative exposure of the catalyst to thermal ageing conditions reached and/or exceeded the pre-determined fraction of the pre-determined threshold value, whereby the accumulated exposure of the catalyst to thermal ageing conditions (denoted as TAI, "thermal ageing index") is calculated using the equation:

$$TAI = \Sigma_i [e^{(-E/RT_i)} \Delta t_i]$$

whereby E/R=activation energy of the sintering process; $T_i$=catalyst temperature over the i-th time interval over the catalyst lifetime and $\Delta t_i$=length of the i-th interval over catalyst lifetime.

EP 1 544 431 B1 provided a method for estimating the efficiency of a catalyst located in an exhaust path and/or manifold of an internal combustion engine. The method of this invention is based on the assumption that the loss of the efficiency of the high-temperature automotive catalyst is caused, primarily, by thermal ageing. With the parameters of the catalyst temperature recorded with uniform and small time increment over the life of the catalyst, the catalyst efficiency loss can be predicted with high accuracy. With the use of an accurate exhaust gas temperature sensor and/or implied virtual temperature sensor, and knowing a time on-line and/or time on-line during which the catalyst is operated at temperatures above a predetermined threshold temperature, a value of the accumulative exposure of a catalyst to thermal ageing conditions i.e. a thermal ageing index can be calculated using an equation describing the ageing of the catalyst.

Based on the pre-measured correlation between the thermal ageing index and the efficiency of the catalyst, the threshold limiting value of the thermal ageing index is known which corresponds to the threshold (minimally accepted) catalyst efficiency, and also a functional dependence of catalyst efficiency on the thermal ageing index is known. Comparing the actual value and the known threshold value of the thermal ageing index, or applying the predetermined functional correlation between thermal ageing index and catalyst properties as catalyst efficiency, actual catalyst efficiency, or catalyst efficiency loss, or percentage of the catalyst efficiency (resources) left can be accurately estimated.

The method disclosed in EP 1 544 431 B1 assumes that the loss of the efficiency of the high temperature automotive catalyst (TWC, DOC or cDPF) is caused, primarily, by the loss of the supported metal as Platinum (Pt) etc. specific surface area due to the catalyst ageing. It was deduced that changes of the performance characteristics were more consistent with Platinum-related properties. The correlation coefficients between physical properties and CO performance characteristics were calculated, and the strongest correlation was observed between CO performance characteristics, i.e. either light-off temperature shift or tailpipe emissions.

However, the inventors herein have recognized that the above approaches may not accurately predict the conversion efficiency of thermally and hydrothermally aged catalysts, under certain conditions, e.g. when selective catalytic reduction (SCR) catalysts are employed. Further, the above approaches may not accurately predict the efficiency of a catalyst in both ways, the positive way (improvement of activity, or so called activation of the catalyst), and the negative way (decrease of activity, so called ageing). Further, the above-described approaches may not accurately predict actual catalyst efficiency during engine operation and may not be useful for prediction of the actual catalyst efficiency of different types of catalysts with different types of functionality, e.g., as oxidation of CO, and or hydrocarbons, or soot, or catalysts for removal of NOx, such as SCR catalysts.

In one example approach to at least partially address these issues, a method for estimating an efficiency of a catalyst in an exhaust of an engine comprises: ageing the catalyst consecutively at different temperatures for definite time periods; measuring the catalyst conversion efficiency after each ageing step; calculating the ageing factor for each step of the ageing procedure and the accumulative value of the ageing factors for all steps of the ageing procedure based on the formulation $AF=\Sigma_i(e^{(-E/RT_i)}dt_i)$ whereby E/R=activation energy of the sintering process, $T_i$=catalyst temperature over the i-th time interval over the catalyst lifetime and $dt_i$=length of the i-th time interval over the catalyst lifetime; estimating the activation energy of the ageing process ($E_a/R$) for the catalyst; estimating catalyst efficiency correlation factors related to the measured catalyst conversion efficiency for each temperature point and for all ageing conditions; determining a correlation between the catalyst efficiency correlation factors and the accumulative value of the ageing factors; and calculating the conversion efficiency of the aged catalyst based on a predetermined correlation between the accumulative ageing factor and the catalyst efficiency correlation factor.

In this way, an advantageous method for prediction of the performance of aged catalysts, and in particular for predicting a $NO_x$ conversion efficiency value for aged SCR catalysts is provided. Furthermore, in this approach, a safe index for catalyst operation and a maximum safe temperature operation may be obtained so that aged catalysts are able to deliver optimal performance. Further, such an approach may increase accuracy in the prediction of the actual catalyst efficiency during engine operation for different types of catalysts with different types of functionality, e.g., as oxidation of CO, and or hydrocarbons, or soot, or catalysts for removal of $NO_x$, e.g., in a SCR catalyst.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
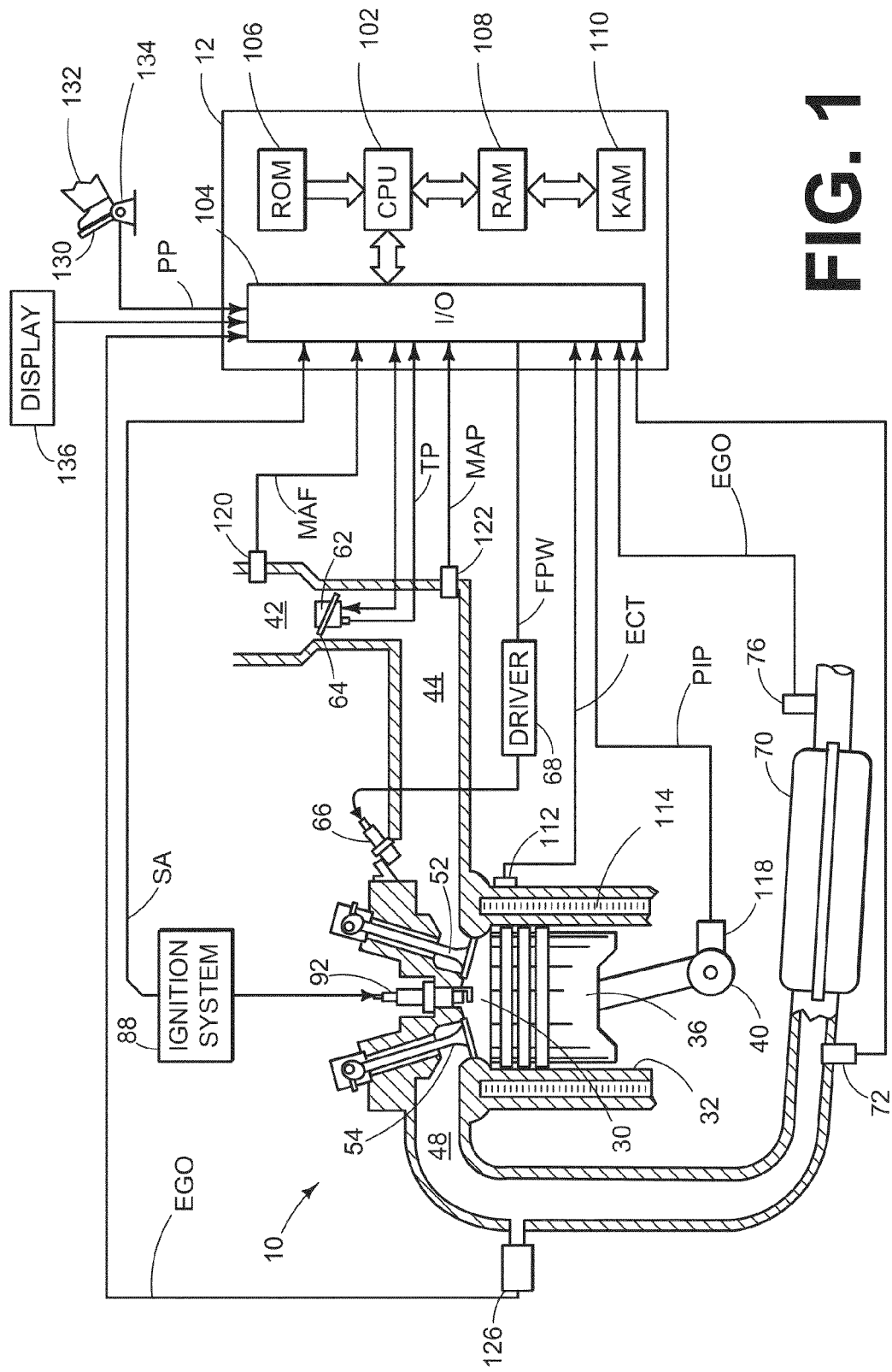
FIG. 1 shows a schematic diagram of an engine with an exhaust aftertreatment system.
Figure 2:
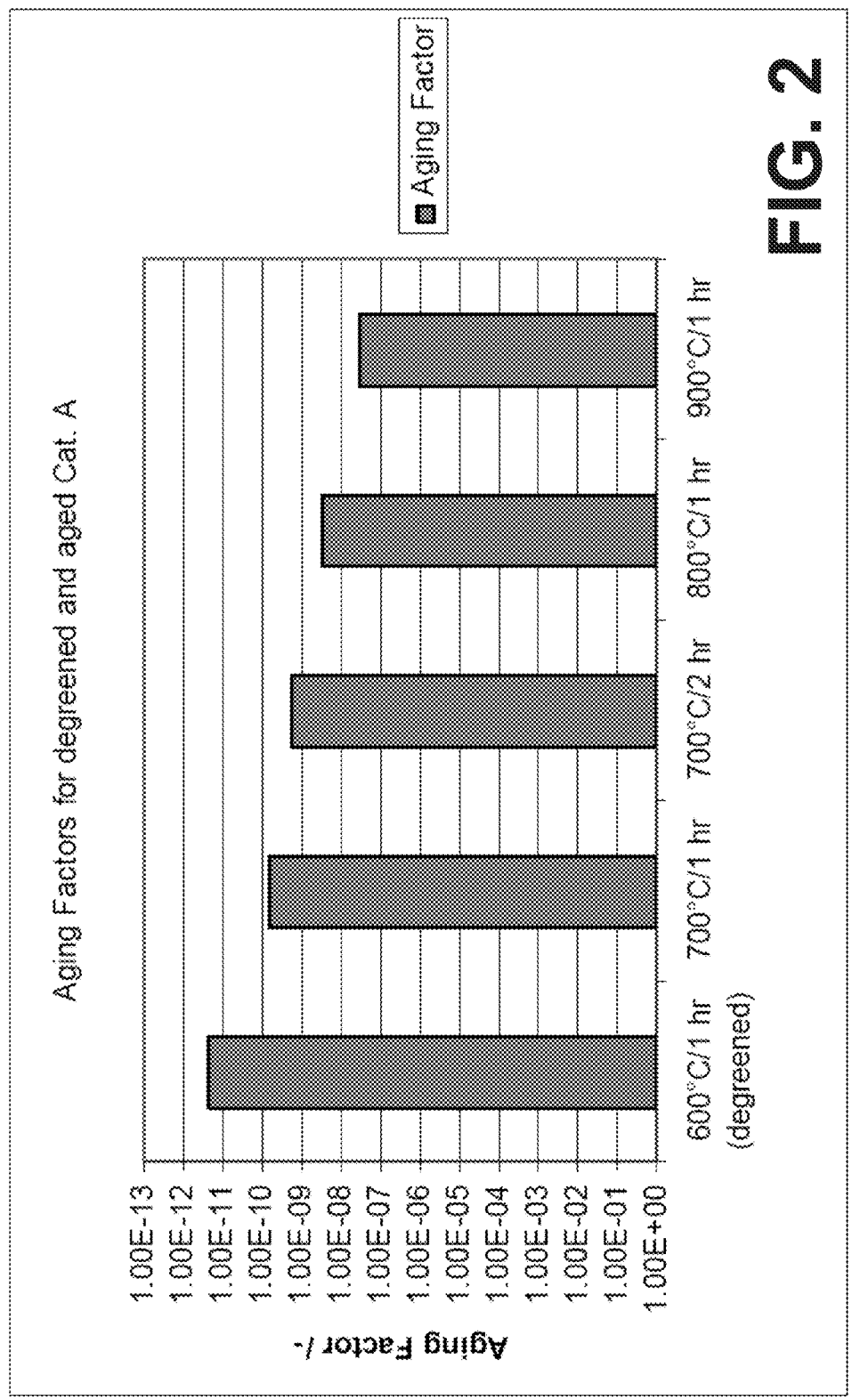
FIG. 2 shows example ageing conditions and ageing factors for a degreened and an aged catalyst.

The present disclosure is directed to systems and methods for estimating the efficiency of a catalyst placed in an exhaust path of a combustion engine, such as the engine shown in FIG. 1. In particular, the present disclosure relates to a method of the prediction of the catalyst efficiency of an automotive catalyst during its lifetime performance, when exposed for the different periods of time to the various high temperatures.

Turning to FIG. 1, a schematic diagram showing one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio. Full-volume exhaust gas sensor 76 is shown coupled to exhaust passage 48 downstream of emission control device 70. Sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. A temperature sensor 72 may be disposed upstream of emission control device 70 to monitor the temperature of the exhaust gas entering the emission control device. However, in some examples a temperature sensor may be positioned proximate to a catalyst so that the temperature of the catalyst may be monitored. It should be understood that the sensor locations shown in FIG. 1 are just one example of various possible configurations. For example, the emission control system may include a partial volume set-up with close coupled catalysts.

The catalyst may be located in the exhaust path and/or downstream of an internal combustion engine. Preferably, the catalyst can be an automotive catalyst. Advantageously, the method may be based on the temperatures seen by a catalyst in its use for control strategy and on-board diagnostics.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Additionally, controller 12 may communicate with a cluster display device 136, for example to alert the driver of faults in the engine or exhaust aftertreatment system.

Storage medium read-only memory 106 can be programmed with computer readable data representing instructions executable by processor 102 for performing the methods described below as well as other variants that are anticipated but not specifically listed.

Turning now to FIGS. 2-7, various testing procedures were employed to determine parameters used in a method of predicting catalyst efficiency in accordance with the disclosure. In the following the testing procedure will be described in detail. All catalysts were tested in a laboratory-scale fixed-bed flow reactor made from a quartz tube. An electric furnace was used for the heating of the reactor.

A core catalyst sample of ¾"D×1"L was inserted into a quartz tube wrapped with a matting material. The cores were equipped with two thermocouples inserted directly before and behind core sample. A conventional flow setup was used for gas mixture preparation. All gases were of ultra high purity. A humidifier was installed to provide precise water concentration in the gas line. The flow rates were controlled using mass flow controllers (MKS, Munich, Germany). To prevent water condensation, all connection lines were heated up to approximately 170° C. Reactor effluents were analyzed with Twin Chemical Ionization MS from V&F, Austria.

The concentration of NO in the gas mixture for experiments was 500 ppm, NH3 600 ppm, O2 10 vol. %, and H2O 10%, and helium as balance. Typically, 500 ppm NO represented NO for experiments, for the NO$_2$/NO mixture, the NO concentration was 375 ppm and $NO_2$ 125 ppm. The total flows were set to obtain SV 30 k; 60 k or 90 k h−1.

Ageing experiments were performed on the synthetic gas bench, and could be done on engine bench as well. Ageing consisted in carrying out the consecutive ageing of the catalyst at different temperatures for different time periods. The fresh catalyst was first aged at a temperature of 600° C. for 1 hour, and then a catalyst efficiency test was performed at different temperatures below 600° C. After the test, the catalyst was aged either at the same temperature for a longer time, or at higher temperature. By several such consecutive ageing procedures and experiments the data on catalyst efficiency were obtained.

In order to correlate performance properties (taken for different temperatures) versus ageing conditions (temperature and time) of catalysts, corresponding initial and aged characteristics (so called ageing factors) were calculated. The typical example of temperatures seen by the catalyst during ageing is given in FIG. 2, which shows also the values of ageing factors related to the ageing conditions. The ageing factor increases with an increased ageing temperature. Moreover, the ageing factor increases with an increased ageing time.

It can be deduced that changes of the performance characteristics are more consistent with changes of physical and physical-chemical properties of the catalysts, but most of these properties are difficult to check when a catalyst is used on a vehicle, and therefore also difficult to use to predict actual performance properties of the catalyst. The found correlations between physical or physical-chemical and performance properties could be used as additional information for catalyst control. For instance the relation between initial and aged catalyst ammonia adsorption capacity vs. temperature could be used for better ammonia slip control.

Figure 3:
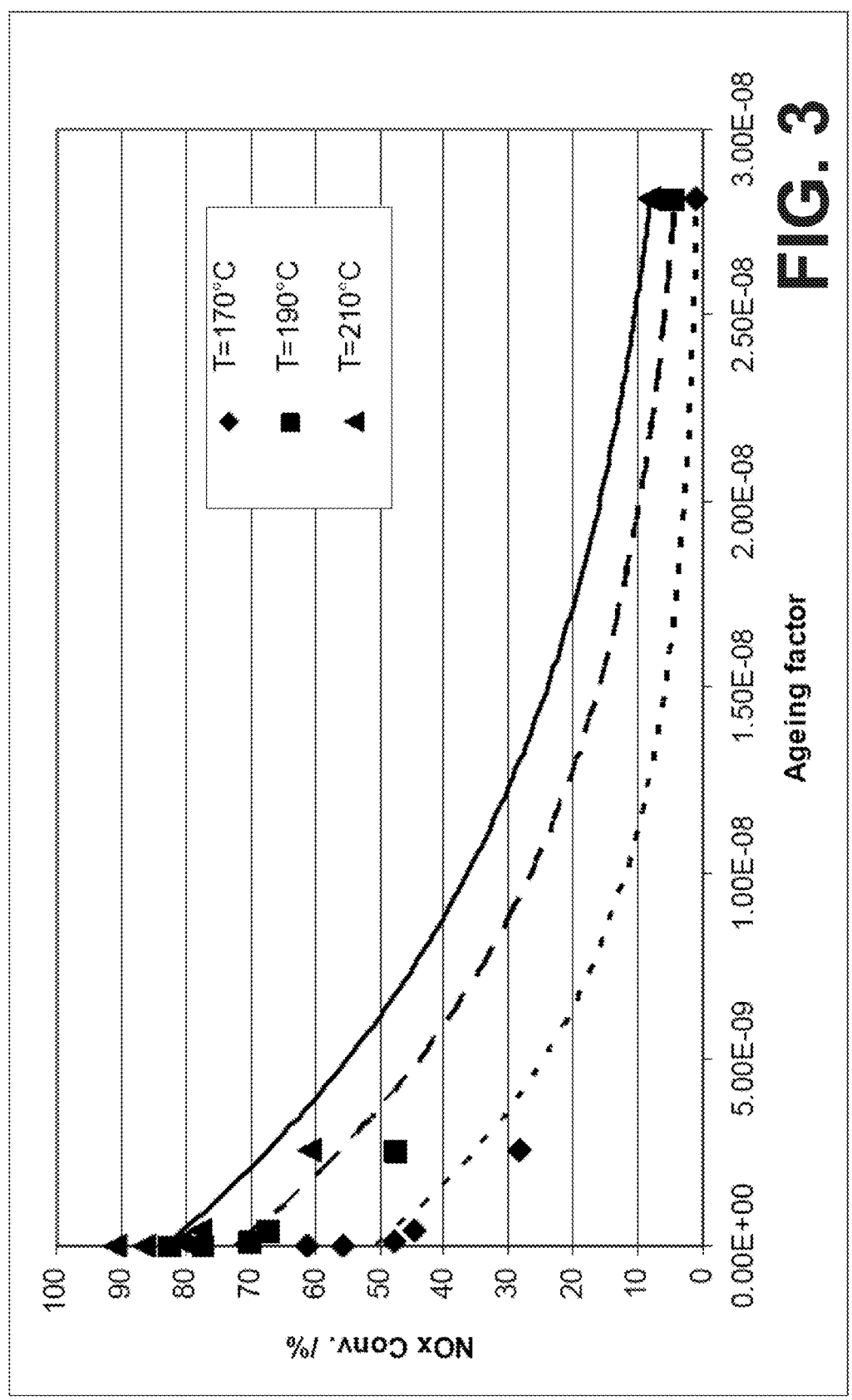
FIG. 3 shows NO conversion at different temperatures vs. ageing factor for different temperatures and times of ageing.
Figure 4:
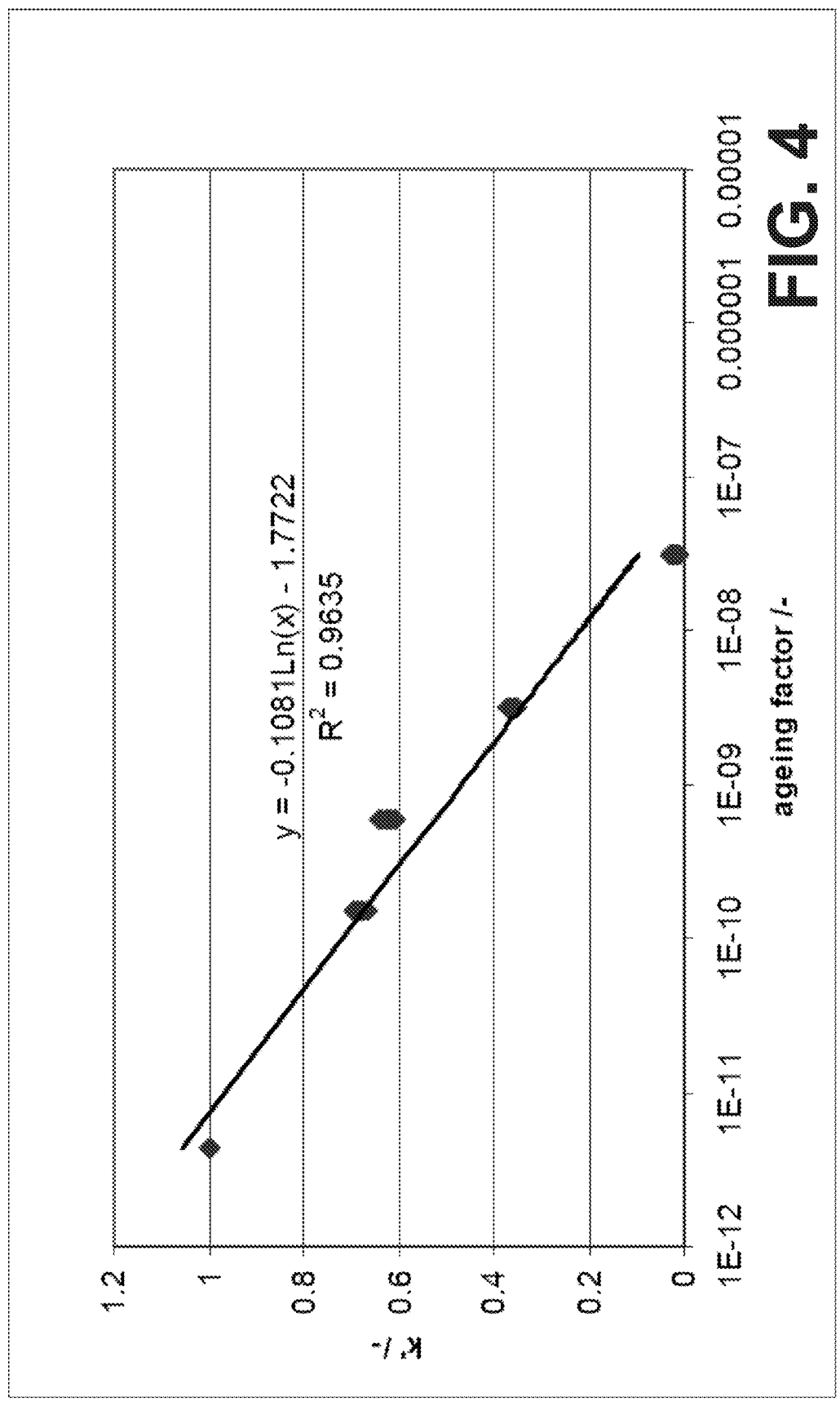
FIGS. 4-5 show normalized reaction rate constants for different temperatures vs. ageing factors for different temperatures and times of ageing.
Figure 5:
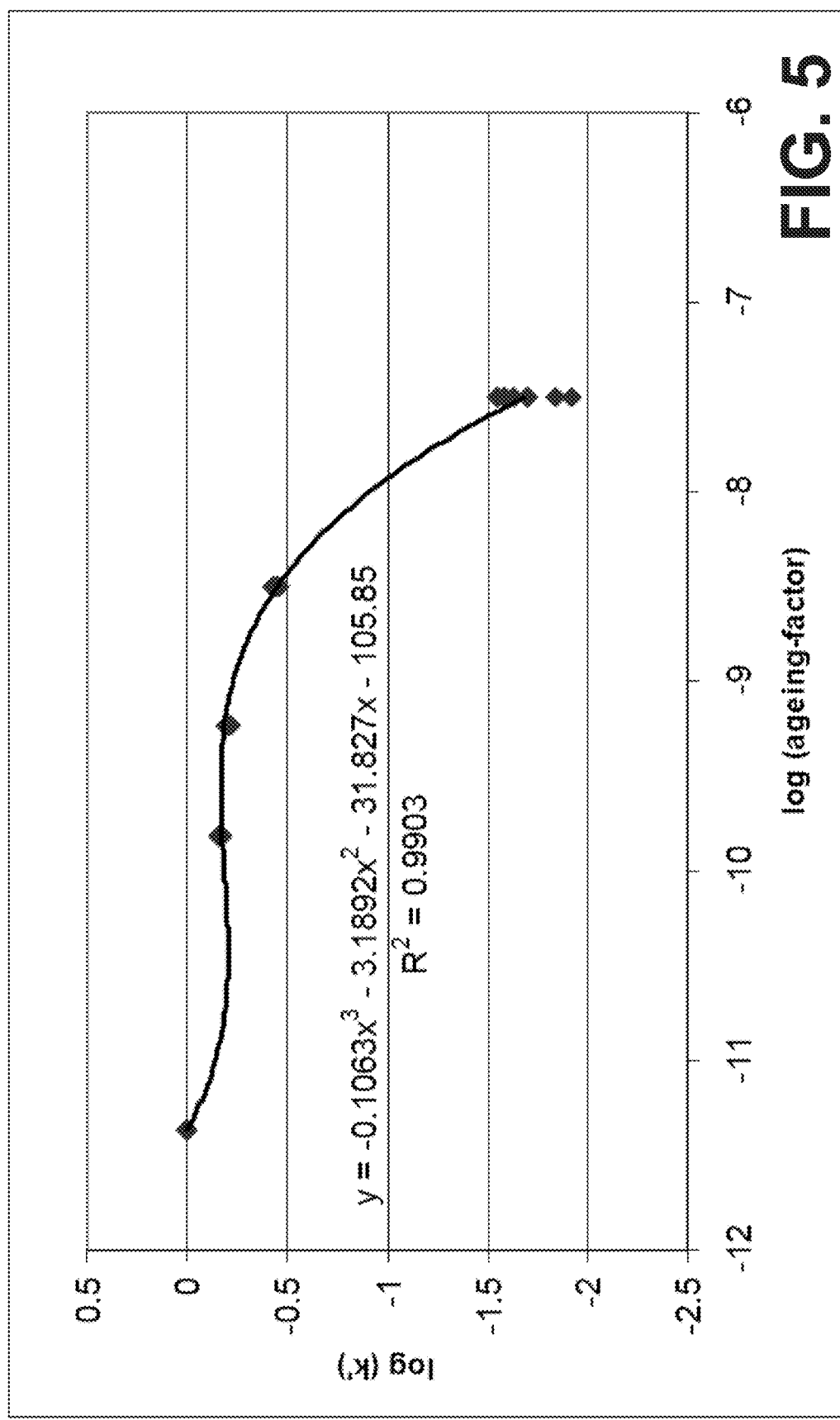

To further illustrate this correlation between ageing factors and performance of catalysts (in this case SCR catalyst Catalyst A) the data are shown in FIGS. 3-5. Catalyst conversion efficiency, in the example $NO_x$ conversion, vs. ageing factor for different temperatures showed similar dependents, but could not be described with one correlation. FIG. 3 shows examples for the dependence of the $NO_x$ conversion efficiency in % on the aging factor for different temperatures (T=170° C., T=190° C. and T=210° C.) and different times of aging of catalyst A. The reaction was performed at a temperature range of 160° C.-210° C. at SV=30 000 h$^{-1}$. The reaction mixture was NO=500 ppm, $NH_3$=600 ppm, $O_2$=10 vol. %, $H_2O$=10%, and balance helium.

It is possible to obtain one common correlation between catalyst performance (conversion efficiency) and ageing factors by introducing estimates of the catalyst efficiency correlation factors related to the measured conversion efficiency for each temperature point and for all ageing conditions (see FIGS. 4 and 5). FIG. 4 shows the normalized reaction rate constant for different temperatures vs. ageing factor for different temperatures and time of ageing (as shown in FIG. 3). The dependence can be described by a logarithmical correlation as expressed in FIG. 4. The reaction was performed at the temperature range 160° C.-210° C. at SV=30 000 h$^{-1}$. The reaction mixture was NO=500 ppm, $NH_3$=600 ppm, $O_2$=10 vol. %, $H_2O$=10% and balance helium.

The normalized reaction rate constant for different temperatures vs. ageing factor for different temperatures and time of ageing (as shown in FIG. 3) can be described by polynomial correlation. This is shown in FIG. 5. The reaction was performed at a temperature range 160° C.-210° C. at SV=30 000 h$^{-1}$. The reaction mixture was NO=500 ppm, $NH_3$=600 ppm, $O_2$=10 vol. %, $H_2O$=10% and balance helium.

Catalyst efficiency correlation factors can be empirically obtained, or expressed as reaction rate constant (k) and/or relative rate constant (k'=k/k$_0$). FIGS. 4 and 5 are also showing the example of determination of the correlation between correlation factor k' and accumulated ageing factor (AF or sometimes called thermal ageing index TAI).

The catalyst efficiency correlation factors obtained for a degreened catalyst or a catalyst aged at lowest temperature, were used for estimating k0' and $E_a/R$, which are then applied together with a predetermined correlation between accumulative ageing factor, and catalyst efficiency correlation factor k or k' for calculating the conversion efficiency of the aged catalyst.

Figure 6:
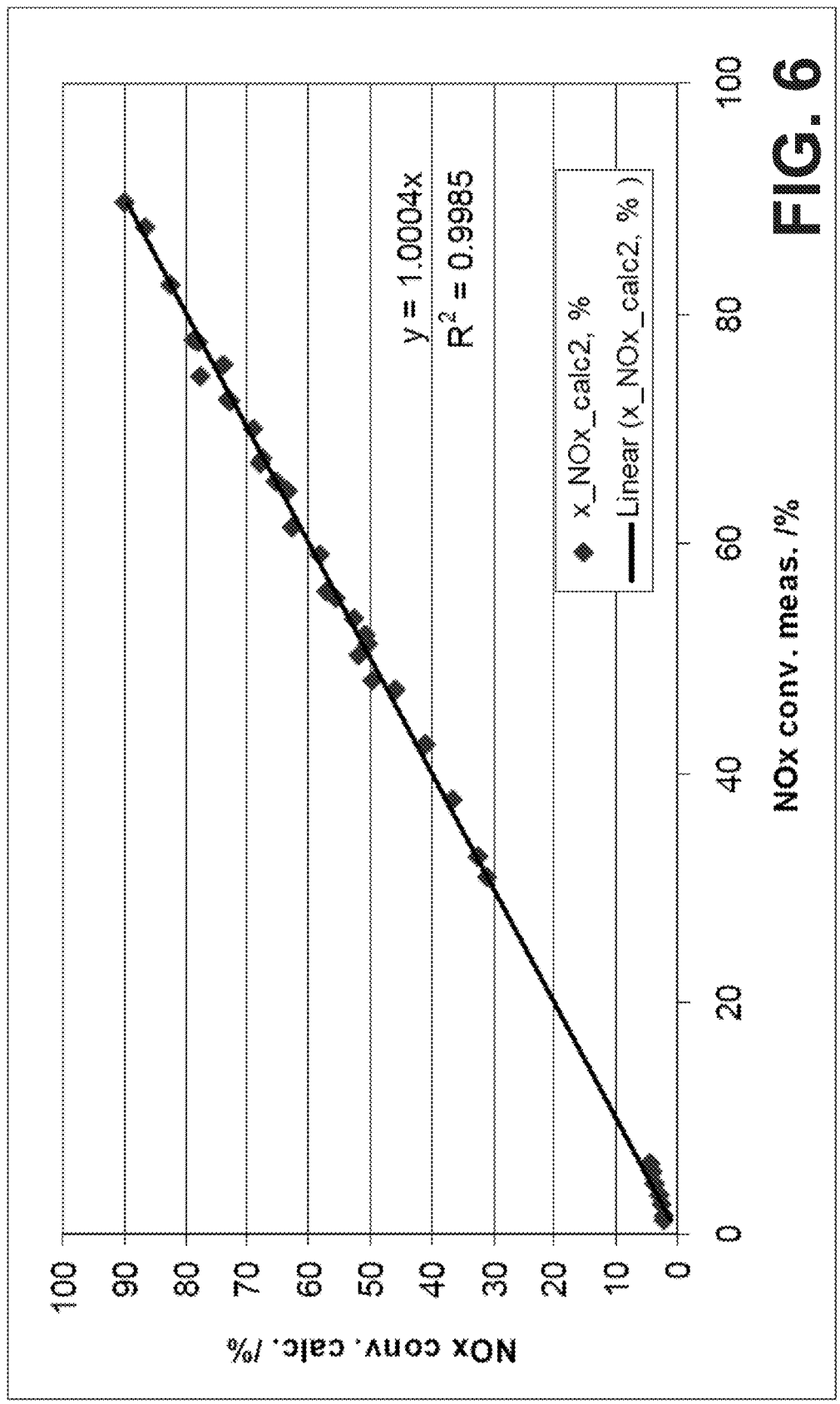
FIG. 6 shows a comparison of predicted and measured NO conversions for aged catalysts based on calculated ageing factors.

This way the obtained predetermined correlation is possible to be used for estimating a threshold limit value of the thermal ageing conditions for required limited catalyst conversion efficiency. A very good correlation for obtaining the catalysts performance in terms of $NO_x$ conversion is shown on FIG. 6. FIG. 6 shows the comparison of predicted and measured NO conversions for aged catalysts via the obtained correlation based on the calculated ageing factor (Catalyst A). The $NO_x$ conversions were obtained for the temperature range 160° C.-210° C. at SV=30 000 h$^{-1}$. The reaction mixture was NO=500 ppm, $NH_3$=600 ppm, $O_2$=10 vol. %, $H_2O$=10%, and balance helium.

Figure 7:
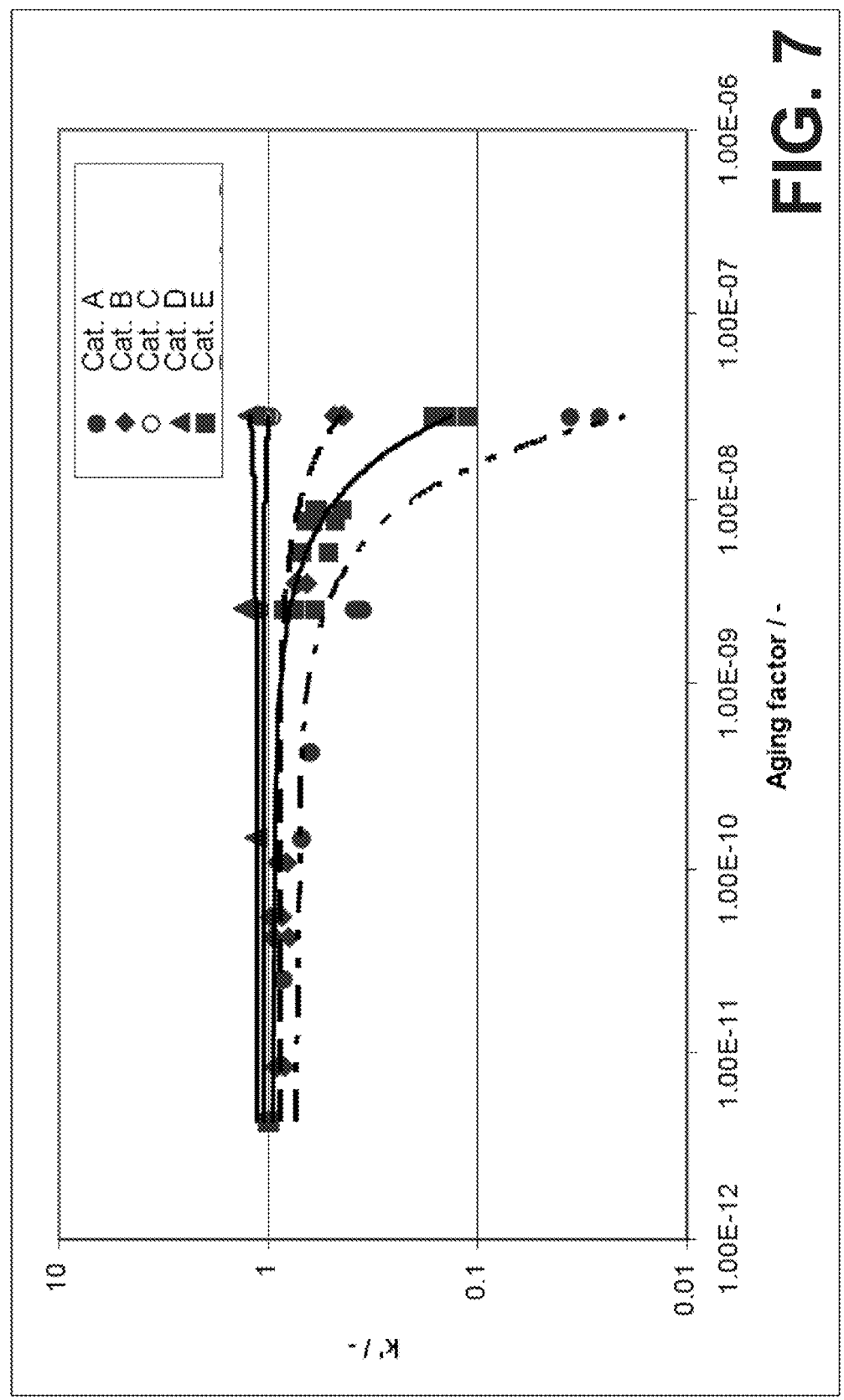
FIG. 7 shows a normalized reaction rate constant for different temperatures vs. ageing factors for different temperatures and time of ageing for additional catalysts.

For further illustration more catalysts (Catalyst A-E) were aged with the same method. The obtained correlations are shown in FIG. 7. FIG. 7 shows the normalized reaction rate constant for different temperatures vs. ageing factor for different temperatures and times of ageing for catalysts A-E. The reaction was performed at a temperature range 160° C.-210° C. at SV=30 000 h$^{-1}$. The reaction mixture was NO=500 ppm, $NH_3$=600 ppm, $O_2$=10 vol. % and $H_2O$=10%. In FIG. 7, less thermally stable catalysts show a steep decline of k' values with increased ageing factor. This is most visible in the case of the catalyst A. Catalysts C and D were more thermally stable.

Figure 8:
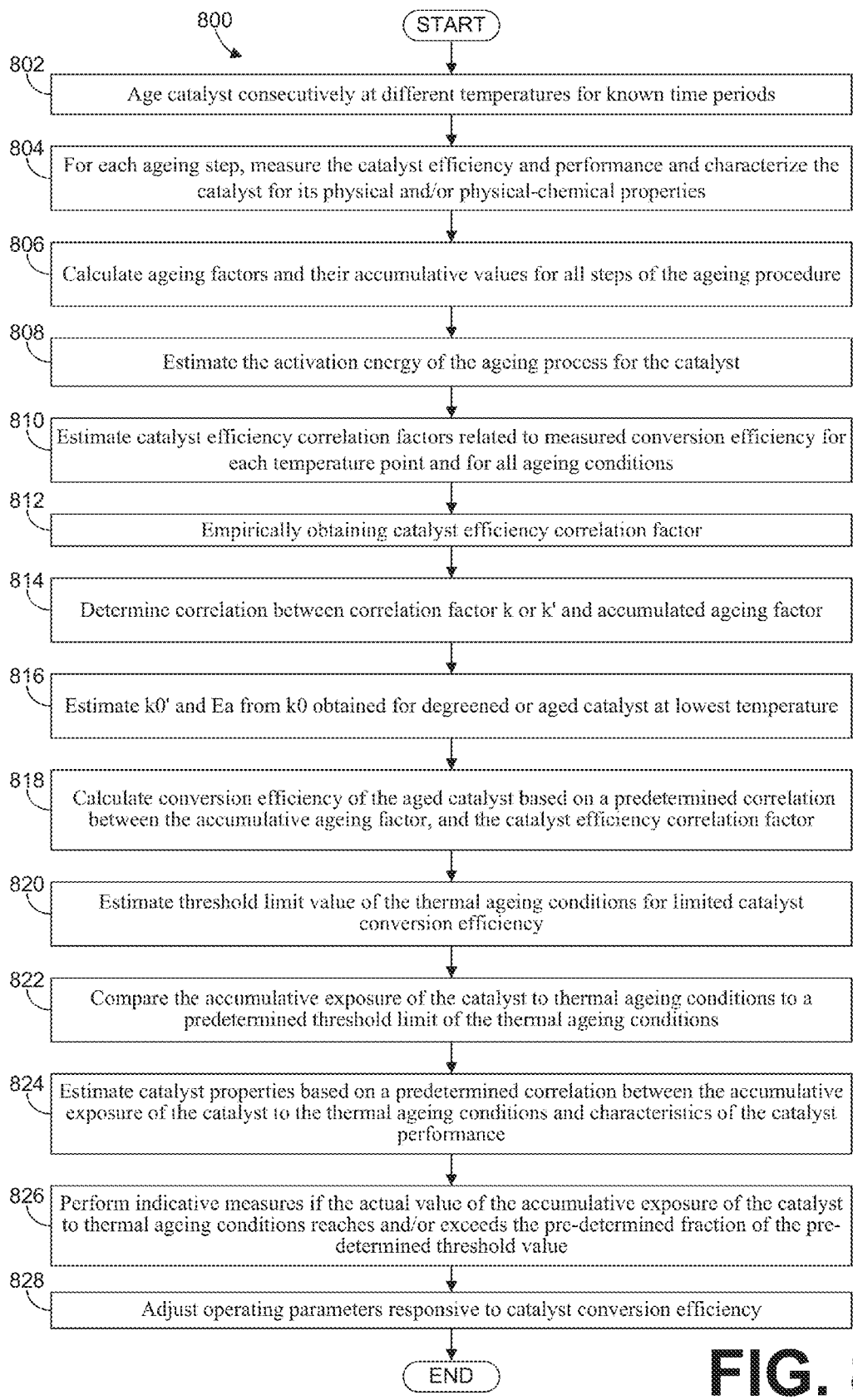
FIG. 8 shows an example method for estimation of efficiency for aged catalysts in accordance with the disclosure.

FIG. 8 shows an example method 800 for estimating the efficiency of a catalyst placed in the exhaust path of the combustion engine. In particular, method 800 may employ data, such as the data described above with regard to FIGS. 2-7, for estimating the efficiency of a catalyst placed in the exhaust path of the combustion engine as described in more detail below. In particular, an ageing process may be performed on a reference catalyst, as described above with regard to FIGS. 2-7, to determine accumulative ageing factors of the catalyst which may then be used in determining catalyst efficiency during engine operation.

Method 800 may be used in different applications. It can be used generally for any type of aged catalysts, for example a catalyst with selective catalytic reduction of nitrogen oxides. Method 800 may be used to estimate a change of catalyst efficiency (for example SCR catalyst for reduction of nitrogen oxides in a combustion exhaust gas) due to its thermal or hydrothermal ageing (deactivation), and in some cases also activation. The method predicts the efficiency of a catalyst in both ways, the positive way (improvement of activity, or so called activation of the catalyst), and the negative way (decrease of activity, so called ageing).

Method 800 relates the known measured NOx conversion efficiency of the SCR catalyst aged at known different temperatures for the known period of time, and at presence of oxygen, and water in the gas stream. The method is based on the temperature exposure history during the operation time, which is related to the experimentally obtained activity of the activated or aged catalysts. With the parameters of the catalyst temperature recorded with uniform and small time increments over the life of the catalyst, the catalyst efficiency loss can be predicted with high accuracy.

At 802, method 800 includes thermally or hydro-thermally ageing the catalyst consecutively at different temperatures for known time periods. At 804, method 800 includes, after each ageing step, measuring the catalyst efficiency and performance, and characterizing the catalyst for its physical and/or physical-chemical properties. In particular, the catalyst can be thermally or hydro-thermally aged and the performance of the catalyst or properties of the catalyst which characterize the performance of the catalyst can be measured after each ageing step. Moreover, the catalyst can be characterized for its physical and/or physical-chemical properties after each ageing step.

At 806, method 800 includes calculating the Ageing Factors (AF), and their accumulative values for all steps of the ageing procedure based on formulation: $AF=SUM_i \ (e(-E/RT_i)*dt_i)$ whereby E/R=activation energy of the sintering process; $T_i$=catalyst temperature over the i-th time interval over the catalyst lifetime and $dt_i$=length of the i-th interval over catalyst lifetime, With the use of an accurate exhaust gas temperature sensor and/or implied virtual temperature sensor, and knowing a time on-line and/or time on-line during which the catalyst is operated at temperatures above a predetermined threshold temperature, a value of the accumulative exposure of a catalyst to thermal or hydrothermal ageing conditions, i.e., a thermal ageing index can be calculated using an equation describing the ageing of the catalyst.

The parameters of the catalyst temperature are preferably recorded with uniform and small increments over the life of the catalyst. For example, the catalyst temperature may be recorded with uniform increments over the life time of the catalyst.

At 808, method 800 includes estimating the activation energy of the ageing process ($E_a/R$) for the catalyst. For example, the activation energy of the ageing process may be based on the calculated ageing factors and/or the accumulative ageing values described above.

At 810, method 800 includes estimating catalyst efficiency correlation factors related to measured conversion efficiency for each temperature point and for all ageing conditions. Catalyst efficiency correlation factors related to measured conversion efficiency for each temperature point and for all ageing conditions may be estimated by using an empirically obtained reaction rate constant (k) and/or relative reaction rate constant (k'). In some examples, the catalyst efficiency correlation factors for the catalyst aged at a lowest temperature can be obtained. The obtained catalyst efficiency correlation factors can be used for estimating the activation energy of the ageing process ($E_a/R$) and a modified reaction rate coefficient ($k_0'$). The activation energy of the ageing process ($E_a/R$) and a modified reaction rate coefficient ($k_0'$) can be applied together with a predetermined correlation between the accumulative ageing factor and the catalyst efficiency correlation factor for calculating the conversion efficiency of the aged catalyst.

At 812, method 800 includes empirically obtaining a catalyst efficiency correlation factor. For example, the catalyst efficiency correlation factor may be expressed as a reaction rate constant (k) and/or a relative rate constant ($k'=k/k_0$). In particular, the reaction rate coefficient ($k_0$) and/or the reaction rate constant (k) and/or relative reaction rate constant (k') and/or the activation energy of the ageing process ($E_a/R$) can be obtained based on the formulation $k=k_0k'=k_0e^{(-E_a/RT)}$.

At 814, method 800 includes determining a correlation between correlation factor k or k' and the accumulated ageing factor (AF). For example, one or more mappings, as described above with regard to FIGS. 2-7, may be used to determine the correlation.

At 816, method 800 includes estimating $k0'$ and Ea from k0 obtained for a degreened or an aged catalyst at a lowest temperature from the Arrhenius relation.

At 818, method 800 includes applying a predetermined correlation between the accumulative ageing factor and the catalyst efficiency correlation factor k or k' for calculating conversion efficiency of the aged catalyst.

At 820, method 800 includes using a predetermined correlation for estimating a threshold limit value of the thermal ageing conditions for a required limited catalyst conversion efficiency. The predetermined correlation between the accumulative ageing factor and the catalyst efficiency correlation factor may be used for estimating a threshold limit value of the thermal ageing conditions for required limited catalyst conversion efficiency. Furthermore, the accumulative exposure of the catalyst to thermal ageing conditions can be compared to a predetermined threshold limit of the thermal ageing conditions. Advantageously, a predetermined correlation between the accumulative exposure of the catalyst to thermal ageing conditions and characteristic of the catalyst performance can be applied to estimate the catalyst properties.

At 822, method 800 includes comparing the accumulative exposure of the catalyst to thermal ageing conditions to a predetermined threshold limit of the thermal ageing conditions.

At 824, method 800 includes applying a predetermined correlation between the accumulative exposure of the catalyst to the thermal ageing conditions and a characteristic of the catalyst performance to estimate the catalyst properties. In particular, based on the pre-measured correlation between the thermal ageing index and the efficiency of the catalyst, the threshold limiting value of the thermal ageing index is known which corresponds to the threshold (minimally accepted) catalyst efficiency, and also a functional dependence of catalyst efficiency on the thermal ageing index is known. Comparing the actual value and the known threshold value of the thermal ageing index, or applying the predetermined functional correlation between thermal ageing index and catalyst properties as catalyst efficiency, actual catalyst efficiency, or catalyst efficiency loss, or catalyst efficiency gained, or percentage of the catalyst efficiency (resources) left can be accurately estimated.

At 826, method 800 includes performing indicative measures if the actual value of the accumulative exposure of the catalyst to thermal ageing conditions is reached and/or exceeded by the pre-determined fraction of the pre-determined threshold value. Moreover, indicative measures may be performed in the case the actual value of the accumulative exposure of the catalyst to thermal ageing conditions reaches and/or exceeds a predetermined fraction of a predetermined threshold value. For example, degradation of the catalyst may be indicated if the catalyst conversion efficiency falls below a predetermined threshold value.

At 828, method 800 includes adjusting operating parameters responsive to catalyst conversion efficiency. In particular, the found correlations between physical or physical-chemical and performance properties described above can be used as additional information for catalyst and engine control. For example, if the catalyst is a selective catalytic reduction catalyst, the engine operating parameter may be an amount of urea or ammonia provided to the catalyst. For instance the relation between initial and aged catalyst ammonia adsorption capacity vs. temperature could be used for better ammonia slip control. As another example, the operating condition may be an engine air/fuel ratio. For example, a change in catalyst efficiency may result in a change in schedule of catalytic purge events, such as NOx reduction in an SCR catalyst. Thus, the engine may be operated in a rich or lean mode to accommodate the change in catalytic efficiency.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for estimating an efficiency of a catalyst in an exhaust of an engine, comprising:
    ageing the catalyst consecutively at different temperatures for definite time periods;
    measuring the catalyst conversion efficiency after each ageing step;
    calculating an ageing factor for each step of an ageing procedure and an accumulative value of the ageing factors for all steps of the ageing procedure based on a formulation $AF=\Sigma_i(e^{(-E/RT_i)}dt_i)$ whereby $E/R$=activation energy of a sintering process, $T_i$=catalyst temperature over an i-th time interval over a catalyst lifetime and $dt_i$=length of the i-th time interval over the catalyst lifetime;
    estimating an activation energy of an ageing process ($E_a/R$) for the catalyst;
    estimating catalyst efficiency correlation factors related to the measured catalyst conversion efficiency for each temperature point and for all ageing conditions;
    determining a correlation between the catalyst efficiency correlation factors and the accumulative value of the ageing factors;
    calculating the conversion efficiency of the aged catalyst based on a predetermined correlation between the accumulative ageing factor and the catalyst efficiency correlation factor, obtaining the catalyst efficiency correlation factors for the catalyst aged at a lowest temperature; and
    estimating the activation energy of the ageing process ($E_a/R$) and a modified reaction rate coefficient ($k_0'$) based on the obtained catalyst efficiency correlation factors; and
    calculating the conversion efficiency of the aged catalyst based on the activation energy of the ageing process ($E_a/R$) and the modified reaction rate coefficient ($k_0'$) together with a predetermined correlation between the accumulative ageing factor and the catalyst efficiency correlation factor, wherein a reaction rate coefficient ($k_0$) and/or a reaction rate constant (k) and/or a relative reaction rate constant (k') and the activation energy of the ageing process ($E_a/R$) are based on a formulation where the reaction rate constant is a product of the modified reaction rate coefficient and an exponential of a negative of the activation energy divided by a temperature.

2. The method of claim 1, wherein ageing the catalyst comprises thermally or hydro-thermally ageing the catalyst and the method further comprises measuring performance of the catalyst after each ageing step and/or characterising physical and/or physical-chemical properties of the catalyst after each ageing step.

3. The method of claim 1, further comprising estimating a threshold limit value of a thermal ageing conditions for a required limited catalyst conversion efficiency based on the predetermined correlation between the accumulative ageing factor and a catalyst efficiency correlation factor, comparing an accumulative exposure of the catalyst to thermal ageing conditions to a predetermined threshold limit of the thermal ageing conditions, estimating catalyst properties based on a predetermined correlation between the accumulative exposure of the catalyst to thermal ageing conditions and characteristics of a catalyst performance, and performing indicative measures if an actual value of the accumulative exposure of the catalyst to thermal ageing conditions reaches and/or exceeds a predetermined fraction of a predetermined threshold value.

4. The method of claim 1, further comprising recording the catalyst temperature with uniform increments, and wherein the catalyst includes selective catalytic reduction of nitrogen oxides.

5. A method for controlling an engine with a catalyst, comprising:
    adjusting an engine operating parameter responsive to a catalyst conversion efficiency based on predetermined accumulative ageing factors of the catalyst, the accumulative ageing factors related to measured conversion efficiency for each temperature point and for all ageing conditions by using an empirically obtained reaction rate constant (k), relative reaction rate constant (k'), and activation energy of an ageing process ($E_a/R$) based on a formulation wherein the empirically obtained reaction rate constant is equal to a product of the relative reaction rate constant and an exponential of a negative of the activation energy of the ageing process divided by a temperature.

6. The method of claim 5, wherein the catalyst is a selective catalytic reduction catalyst and the engine operating parameter is an amount of urea provided to the catalyst.

7. The method of claim 5, wherein the operating condition is an engine air/fuel ratio.

8. The method of claim 5, further comprising performing indicative measures if a value of accumulative exposure of the catalyst to thermal ageing conditions reaches and/or exceeds a predetermined fraction of a predetermined threshold value.

9. The method of claim 5, further comprising indicating degradation of the catalyst if the catalyst conversion efficiency falls below a threshold value.

* * * * *